Figure 1:
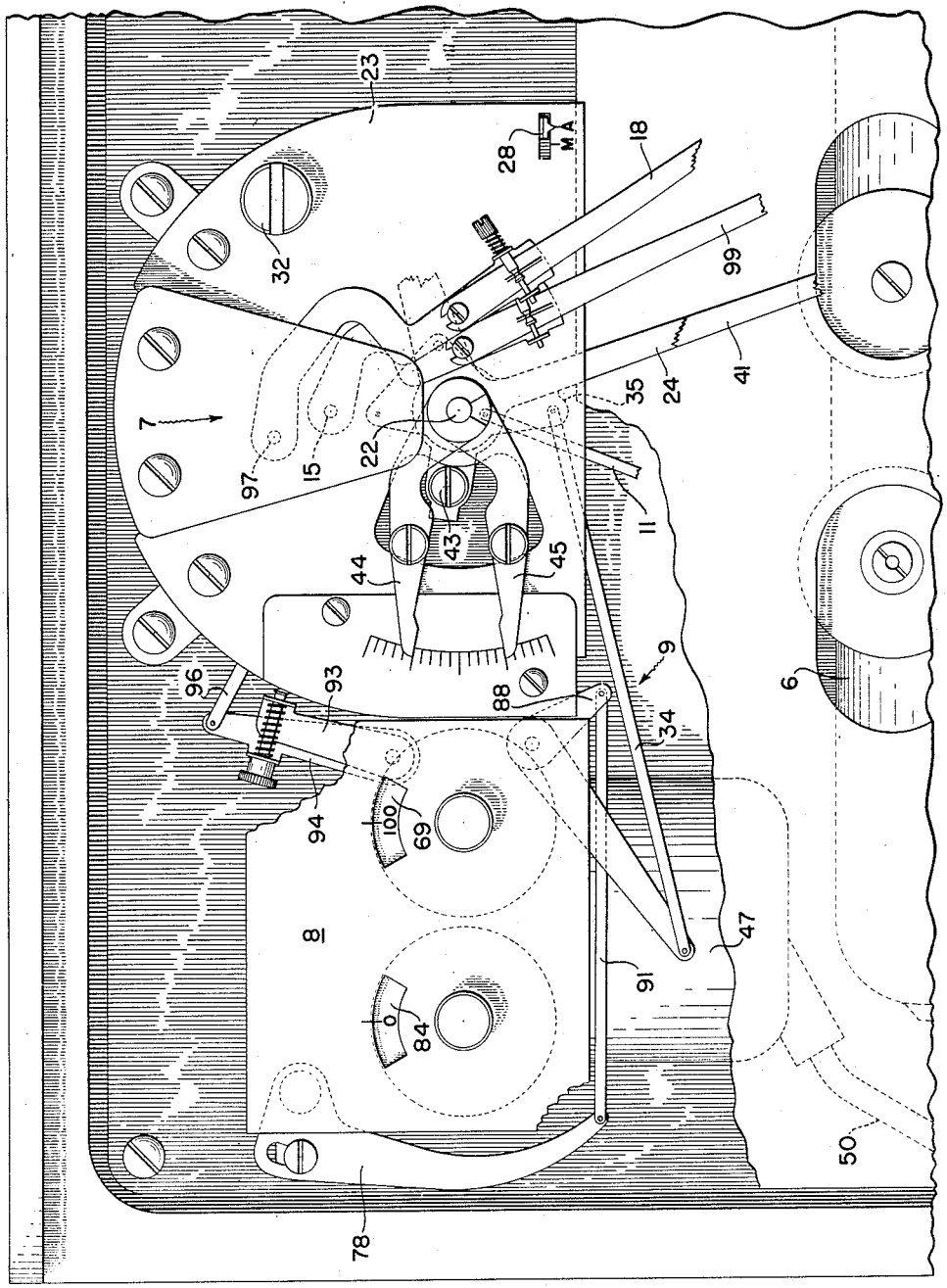

April 17, 1951  E. C. BURDICK  2,548,943
AIR CONTROL INSTRUMENT
Filed Aug. 2, 1946  4 Sheets-Sheet 1

INVENTOR.
EDWIN C. BURDICK
BY E. Wellford Mason
ATTORNEY.

April 17, 1951 E. C. BURDICK 2,548,943
AIR CONTROL INSTRUMENT
Filed Aug. 2, 1946 4 Sheets-Sheet 2
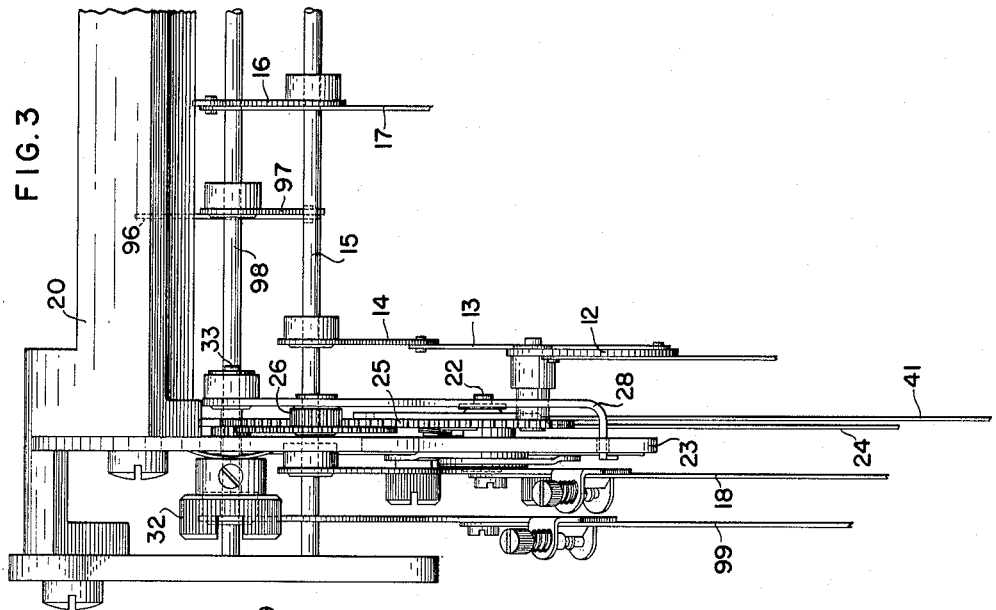
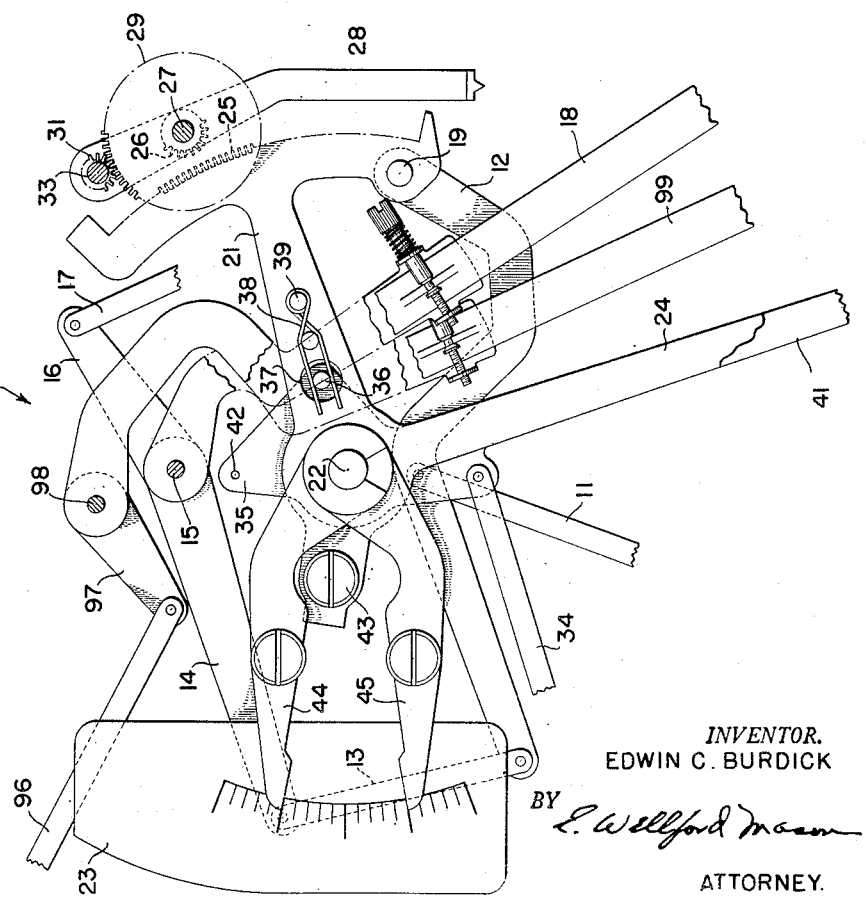
INVENTOR.
EDWIN C. BURDICK
BY
ATTORNEY.

April 17, 1951     E. C. BURDICK     2,548,943
AIR CONTROL INSTRUMENT
Filed Aug. 2, 1946     4 Sheets-Sheet 3
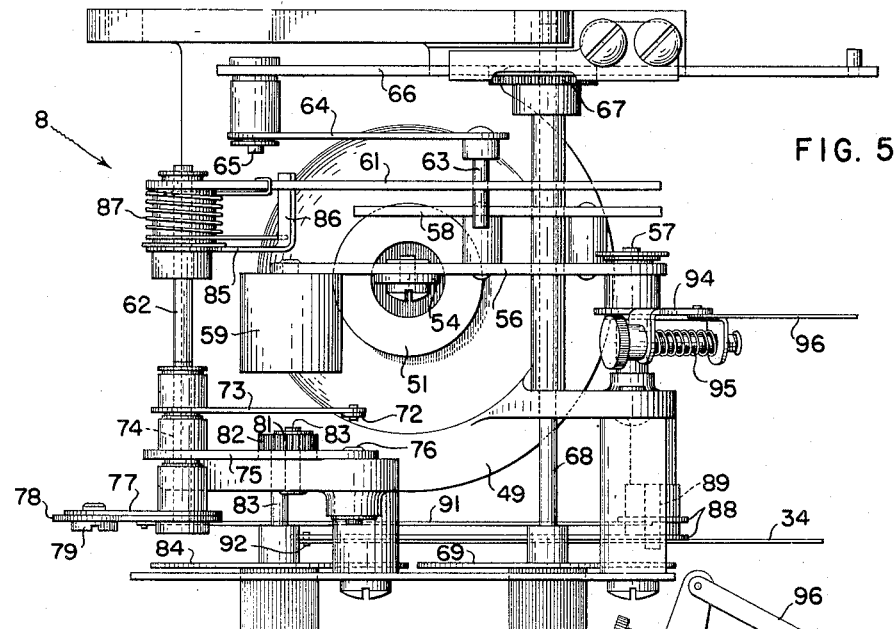
FIG. 5
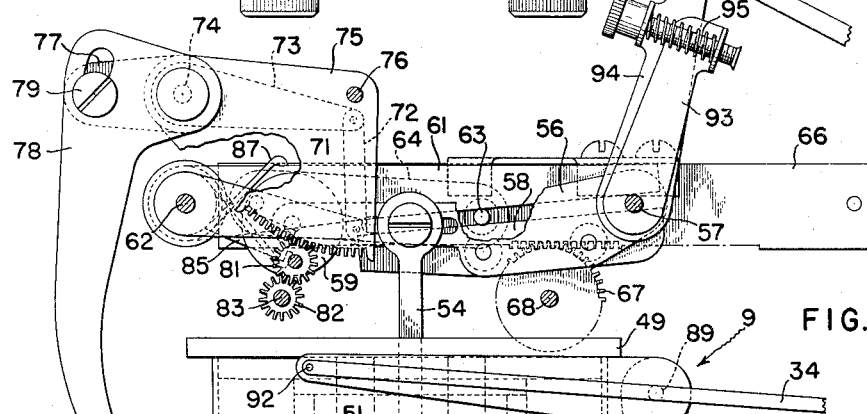
FIG. 4
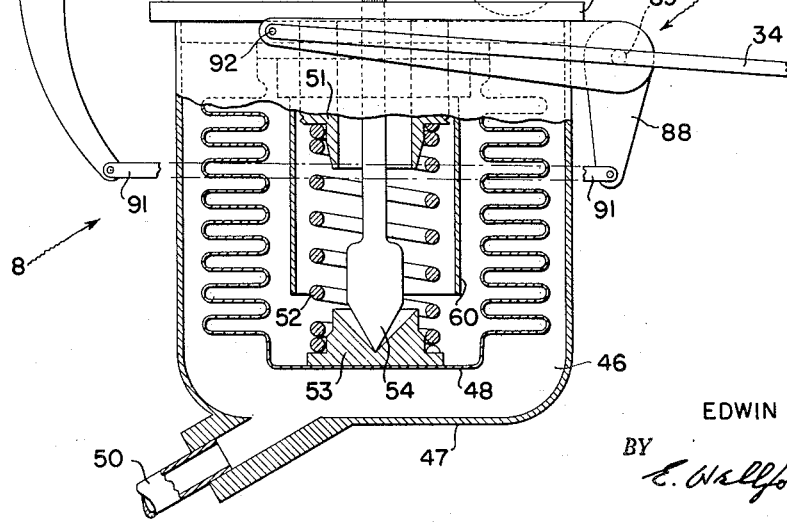
*INVENTOR.*
EDWIN C. BURDICK
BY
ATTORNEY.

April 17, 1951 E. C. BURDICK 2,548,943
AIR CONTROL INSTRUMENT
Filed Aug. 2, 1946 4 Sheets-Sheet 4

INVENTOR.
EDWIN C. BURDICK
BY
ATTORNEY

Patented Apr. 17, 1951

2,548,943

UNITED STATES PATENT OFFICE 2,548,943

AIR CONTROL INSTRUMENT

Edwin C. Burdick, Philadelphia, Pa., assignor, by mesne assignments, to Minneapolis-Honeywell Regulator Company, Minneapolis, Minn., a corporation of Delaware Application August 2, 1946, Serial No. 687,927

12 Claims. (Cl. 74—1)

The present invention relates to control instruments and more particularly to a control instrument which may have its control point, or the value at which the condition under control is maintained adjusted either automatically or manually.

In many control installations it is necessary to have the value at which one condition is maintained adjusted in accordance with variations in another condition. While the instrument may be used with any two related conditions that can be measured and controlled, it will be described herein as controlling flow and having the control point adjusted in response to variations in temperature. This example is being used because in many control systems it is usual to control the flow of fuel to a heater, for example, and to reset the control point of the flowmeter in response to the temperature of the heater.

When any control instrument of the type described is used it is desirable, if not necessary to adjust the control point of the instrument manually as well as automatically. When this is done some means must be provided to indicate whether or not the manual adjustment of the control point is the same as that called for by the automatic adjusting means. Otherwise when the instrument is returned from manual to automatic there will be a jump in the control point that will have a tendency to upset the flow and thereby the value of the temperature.

In a control system of the type described it is often desirable to shift the relation of one of the conditions with respect to the other. That is to vary the amount that the flow will be adjusted for a given variation in temperature and to vary the point at which a change in temperature will begin to have an effect on the value of the flow. The former of these adjustments is generally referred to as the span adjustment since it determines the span or percentage of full scale that the control point of the flow controller is adjusted for full scale variation of the temperature. The second of these adjustments is referred to as the zero adjustment since it determines the starting point of the control index of the flow controller for a minimum value of the temperature.

Another problem that is encountered in a flow-temperature interlocked control system is the different type calibrations that are used for instruments responsive to these two conditions. Most flow meters have a square root scale on them since differential pressure varies in accordance with the square of the flow, whereas the scale on a temperature measuring instrument is generally substantially linear. This means that the control index will be given the same linear movement for a given temperature change, whether the flow under control is small and the scale divisions are close together or whether the flow under control is large and the scale divisions are further apart. Therefore the effective movement of the control point is greater for small flows than it is for large flows. In some control systems where the flow remains nearly constant in one portion of the scale this difference in characteristic is not of great importance. In other systems where the flow varies from one end of the scale to the other the difference in the calibration curves of the flow and temperature instruments can be objectionable.

It is an object of the present invention to produce a control system in which variations in the value of one condition may be used to adjust the value at which a second condition is to be maintained. The system includes a pneumatic control instrument that is provided with means to have its control point adjusted either manually or automatically. It is a further object of the invention to provide a control point adjusting mechanism in which means are provided to indicate whether or not the manual adjustment is identical with the adjustment which would be made by the automatic adjusting means.

It is a further object of the invention to provide a pneumatic control point adjusting unit for a control instrument which unit is provided with a span adjustment and a zero adjustment.

It is a further object of the invention to provide in a control instrument having automatic control point adjusting means a connection between the control unit and the control point adjusting unit which will permit an adjustment of the control point along a substantially square scale for linear adjustments of said unit. This is particularly useful where flow is being adjusted in response to temperature variations.

It is a further object of the invention to provide a control instrument having pneumatic control point adjusting means that has built into it various adjustments by means of which the control unit may be made to control a first variable condition in accordance with almost any desired relation with a second variable condition. Because of the versatility of the adjustments provided the instrument may be used with advantage in any type of interlocked control system. It is a further object of the invention to provide a control instrument having various adjustment instrumentalities that are accessible at all times.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 6:
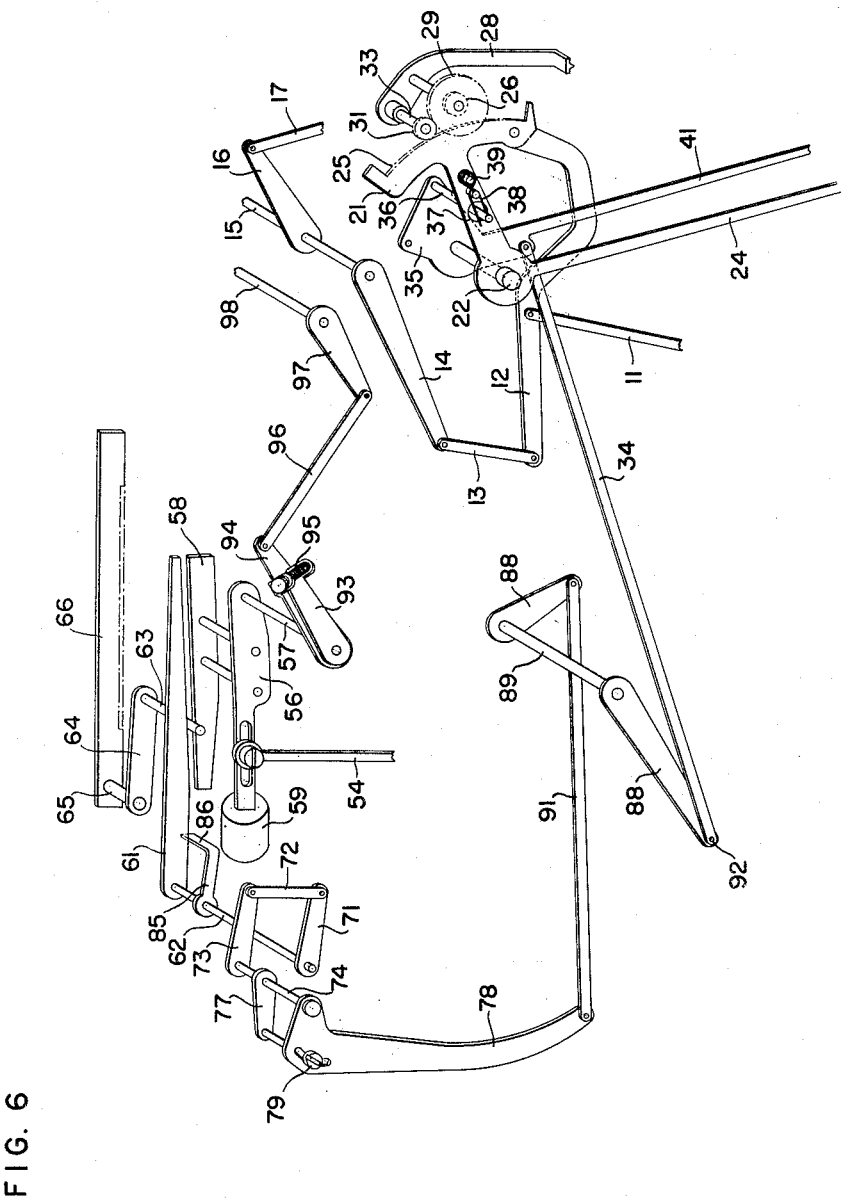

In the drawings:

Figure 1 is a view showing the upper part of a control instrument and including all of the adjusting and controlling units and showing the connections between the same, Figure 2 is an enlarged front view of the control point adjusting lever system, Figure 3 is a side view of the control point adjusting lever system looking from the right in Figure 2, Figure 4 is a front view of the pneumatic control point adjusting unit, Figure 5 is a top view of Figure 4, and Figure 6 is a diagrammatic view showing the lever arrangements of the entire control instrument.

The mechanism of the instrument may be divided into several units which may be separately assembled and then mounted together in a single instrument case. After this the various units are connected together so that they operate to produce the type of control desired. The units in some cases may have use individually, but more often are only of use when used in connection with or in combination with other units of the instrument. It is noted that each of the units is shown in detail and in its relation to the other units in one or more figures of the drawings and that the entire mechanism is shown diagrammatically in Figure 6.

Referring first to Figure 1 there is shown at 6 a control unit which may take the form of a control instrument of the type disclosed in Moore Patent 2,125,081 issued on July 26, 1938. This control instrument or unit is operated by a control point adjusting lever mechanism shown generally at 7. The lever mechanism may be manually adjusted or it may be remotely adjusted in response to some other variable. This latter is accomplished by the remote pneumatic control point adjusting unit which is shown generally at 8. Connecting the units 7 and 8 is a lever system 9 that is used to change a linear characteristic in the unit 8 to substantially a square root characteristic for moving the control index of the control unit 6.

The control unit is operated by axial movement of a link 11 that is connected at its lower end to a lever of that unit and is fastened at its upper end to the mid point of a floating lever 12. This latter lever has its left end moved in response to changes in the value of some variable condition, which is intended herein to be flow. To this end lever 12 is connected by a link 13 to the outer end of an arm 14 which is attached to a pen shaft 15. Shaft 15 is moved in response to variations in the flow under measurement by means of a second arm 16 that is attached to the shaft and whose outer end is connected to and operated by a link 17 that is shown broken off. It is intended that this link should be moved in a vertical direction to rotate shaft 15 directly by an actuating element of a flow measuring system such as that disclosed in Harrison Patent 1,743,853 which was granted on January 14, 1930, or from the receiving element of a pneumatic transmission that is operated by the Harrison flow meter. Shaft 15 also has attached to it a pen arm 18 that is moved across a chart (not shown) to make a record of the value of the flow.

The right end of floating lever 12 is pivoted at 19 to a segment lever 21 which is in turn pivoted on a shaft 22 that is mounted in a supporting plate 23. This latter plate is suitably attached to a stationary part 20 of the instrument casing. The segment lever 21 is moved around its pivot in order to raise or lower the right end of a floating lever 12 and thereby adjust the control point at which the control unit will tend to maintain the flow. Lever 21 is normally stationary so that the floating lever 12 is only moved by variations in the flow and the position of this lever or the control point of the instrument is indicated by an index 24 that extends therefrom over the chart (not shown). If, however, the control point of the instrument is to be changed lever 21 is moved around its pivot. This may be accomplished manually by a train of gears including gear teeth 25 that are formed on the right edge of the segment, which teeth mesh with a pinion 26 that is pivoted at 27 on a lever 28. It will be seen that as the pinion is rotated segment lever 21 will be moved around its pivot 22 to raise or lower the right end of floating lever 12. Mounted concentrically with and attached to pinion 26 is a gear 29 that is in turn meshing with a smaller gear 31. This latter gear is mounted for rotation with a knob 32 that may be rotated by an operator either with his fingers or by the aid of a screw driver. The gear 31 and knob 32 are mounted concentric with a shaft 33 around which lever 28 is pivoted. It will be seen in the drawing that pinion 26 is not in engagement with teeth 25. This indicates that the instrument is set for automatic control point adjustment. If, however, lever 28 is moved in a clockwise direction to bring pinion 26 into mesh with teeth 25 on segment lever 21 rotation of knob 32 may be used to adjust manually the instrument control point.

The remote control point adjustment or automatic control point adjustment of the instrument is obtained by horizontal movement of a link 34, the right end of which is attached to a second rotatable member 35 that is also pivoted on shaft 22. Movement of link 34 and part 35 is imparted to segment lever 21 by means of a pin 36 that projects upwardly from the face of member 35 through an opening 37 that is formed in the segment lever. Normally pin 36 is kept in the center of the opening 37 by means of a spring 38 that is attached to a pin 39 on the segment lever. This spring is of sufficient stiffness so that as member 35 is rotated the pin will act through the spring to also shift segment lever 21 and differential lever 12. It is noted that plate 35 is provided with a second index pointer 41 that lies directly beneath pointer 24 when pin 36 is centered in opening 37. The purpose of the two pointers is to indicate when the control point of the control unit is adjusted to the same position both manually and automatically as will be described below in more detail. It is noted that the right end of link 34 is connected to a plate 35 below pivot 22 so that a movement of link 34 to the left will rotate plate 35 and its connected mechanism in a clockwise direction. In case it should be desired to reverse this direction of movement link 34 may be connected at its right end to plate 35 through an opening 42 which is provided above the pivot 22. If this is done a movement of link 34 to the left will rotate plate 35 in a counter clockwise direction.

At times it may be desirable to prevent the adjustment of the control point of unit 6 beyond some given limits. This is accomplished by providing a stop pin 43 that projects upwardly from the left side of lever 21 through an opening in plate 23 and into a position in which it will engage either one or the other of manually adjustable stop levers 44 and 45. These levers may be adjusted to determine the limits of the control point adjustment, whether this adjustment is made manually or automatically.

The unit for automatically adjusting the control point of the instrument is pneumatically operated and is supplied with air whose pressure varies in accordance with some variable condition that in this case may be assumed to be temperature. It is intended that the pressure be applied to the unit 8 from a pneumatic transmitting device similar to that disclosed in Moore Patent 2,311,853, granted on February 23, 1943, and which is actuated in response to changes in the temperature under measurement. The unit 8 is provided with a chamber 46 that is formed between a cup shaped casing member 47 and a bellows 48 that are attached at their upper ends to a supporting casting 49. The air under regulated pressure is supplied to the chamber through a tube 50. Located in the casting is a threaded plug 51 that has a spring seat formed on its lower end. Resting against this seat is the upper end of a calibrating spring 52, the lower end of which bears against a second spring seat 53 that is attached to the bellows end wall. This spring serves, along with the natural resiliency of the bellows, to cause the bellows to collapse proportional amounts with the pressure changes. If the pressure changes are not too large or if the bellows is stiff enough the spring may be dispensed with. Movement of the bellows end wall in response to the pressure change serves to shift a bellows rod 54 axially. This rod rests with its lower end against a socket formed in spring seat 53 and is adjustably pivoted at its upper end to the outer end of a lever arm 56 that is in turn attached to a pivot shaft 57. Also attached to the lever arm is a bar 58 that is moved with lever arm 56 around shaft 57 in response to changes in pressure applied to the chamber 46. It is noted that there is provided a weight 59 on the outer end of lever arm 56 which weight normally serves to hold bellows rod 54 in place in the spring seat 53. It is also noted that there is provided a sleeve 60 surrounding the spring which serves to limit the amount that bellows 48 can be compressed.

Movement of bar 58 is imparted to an upper bar 61 that is attached to a pivot shaft 62. The movement of bar 58 is imparted to bar 61 through a span or thrust pin 63 which may be positioned at any point along the edges of the two bars. Pin 63 projects from the surface of an arm 64 that is pivoted at 65 to one end of a rack member 66. The pin may be moved with respect to the bars by shifting the rack member axially. This is done by a pinion 67 that is attached to a shaft 68 which is suitably journaled for rotation on an extension of casting 49. Attached to the front of shaft 68 is a dial 69 known as a span dial and which has suitable calibration marks engraved upon its surface. It will be seen that if pin 63 is moved to the right to a position that it is directly in line with pivot shaft 57 any movement of the bellows in response to pressure changes in chamber 46 will have no effect on bar 61. In this position of pin 63 the span adjustment is zero since regardless of the pressure changes in chamber 46 no movement of upper bar 61 and hence no control point adjustment will be obtained. The bars are so shaped that their opposing edges are parallel when the pressure in chamber 46 is at a minimum. Therefore movement of span pin 63 from one end to the other of the bars will not produce any movement of bar 61 if bar 58 is in its zero position. As pin 63 is moved further to the left from its zero position larger and larger movements of bar 61 are obtained for a given movement of bar 58. Thus the span adjustment is increased. At some point in the movement of pin 63 a given movement of bar 58 will produce an equal angular movement of bar 61. This is the hundred percent span position of the pin since, according to the design of the instrument, full range change of the pressure in chamber 46 with pin 63 in this position should produce a full range change of the control point. Any further movement to the left of pin 63 will mean that the control point of the instrument will be adjusted through full range for less than full range compression of bellows 48.

Also fastened to shaft 62 is a lever 71 which extends to the right from that shaft. The outer end of this lever is connected by a short link 72 to the right end of a second lever 73 that is attached to a shaft 74. This shaft is journaled for rotation in a plate that is generally segmental in shape and which is indicated in the drawing at 75. Therefore as bar 61 is moved in response to changes in pressure in chamber 46 lever 73 and shaft 74 will be correspondingly rotated. Plate 75 is mounted for pivotal movement on shaft 76 which is in turn mounted on a stationary part of the instrument and which shaft is behind the right end of lever 73 when a minimum pressure is applied to chamber 46.

Lever 73 is on shaft 74 back of plate 75, as shown in Figure 4, and in front of this plate also attached to the shaft is a lever 77 that in effect, forms an extension of lever 73. Also mounted on shaft 74 for rotation with respect thereto is a lever 78 that extends downwardly to the side of the control point setting unit. This lever is adjustably fastened to lever 77 by means of a pin and slot connection 79. The connection is intended to permit a calibration adjustment to take place between parts 77 and 78 for the purposes for initially setting the zero position of these levers with respect to each other. Segment plate 75 may be rotated to shift the position of pivot shaft 74 and therefore shift the position of the lower end of arm 78 for any given pressure that may be applied to chamber 46. This is accomplished by having a series of gear teeth formed on the lower edge of plate 75 which teeth mesh with an idler pinion 81 that is driven by a pinion 82 on a shaft 83. Attached to the front of shaft 83 is a zero dial 84 that may be rotated to adjust properly shaft 74. The adjustment of plate 75 and those parts attached thereto is intended to give the zero adjustment of the instrument. In other words, this adjustment is intended to determine at what point on the chart the control point of the instrument will be positioned for minimum pressure in chamber 46.

If the zero dial is rotated so that shaft 74 is lowered it will be seen that the lower end of lever 78 will be moved to the right, whereas, if shaft 74 is raised the lower end of lever 78 will be moved to the left. The lower end of lever 78 is connected, in a manner to be described, with link 34 of the control point adjusting unit, thus it will be seen that this link can initially be positioned so that with a minimum pressure in chamber 46 the control index may be moved from any desired portion of the chart or in effect moved to a negative position below the zero of the chart. If the latter is done pointer 24 will be stopped at the chart zero and continued upward movement of shaft 74 will work through the various links and levers to lift bar 61 away from pin 63. Then some pressure above minimum is required in chamber 46 before bar 61 begins to move. Thus, if it is intended that the flow controller shall operate in a normal fashion until the temperature reaches some given point the parts can be so adjusted that variations in the temperature below this point will have no effect on the control point adjustment of the instrument.

From time to time when the control point of the instrument is shifted manually it will be necessary to have an overthrow connection between bar 61 and lever 71 so that the latter can move with respect to the former. This is accomplished by having also mounted on shaft 62 and extending to the right from that shaft a third arm 85 that has a portion 86 bent under bar 61. Portion 86 is held against this bar by a spring 87 which engages both the bar and the portion 86. Normally parts 61, 85, and 71 move as one lever and may be so considered, but in certain circumstances to be described below spring 87 will be flexed to permit relative movement of bar 61 and lever 71.

Movement of arm 78 in response to pressure changes in chamber 46 is used to adjust the control point of the instrument by shifting link 34 and member 35. This movement is transferred through a connection including a bell crank 88 that is pivoted at 89 to a projection on casting 49. The short arm of the bell crank is connected by a link 91 with the lower end of lever 78, while the left end of link 34 is connected to the horizontally extending arm of the bell crank as shown at 92. In the zero position of the parts it is preferable that link 34 extend across the pivot 89 for the bell crank.

As has been pointed out above most flowmeters are provided with a square root chart or scale. This means that in the lower portion of the range the calibration marks are close together and that these calibration marks become further apart toward the higher portions of the range. Therefore it is desirable in adjusting the control point of a flowmeter from a condition that has a linear scale that some means be provided to move the control point in gradually increasing increments for a given condition change as the control point is moved up scale. This is the purpose of the bell crank 88 that is inserted between link 91 and link 34. It will be seen from the drawing that as lever 78 moves to the right, for example, the left end of the horizontal arm of the bell crank will be moved counterclockwise so that link 34 is moved to the right. This movement will be small for a given angular movement of the bell crank to begin with but will gradually become larger as the bell crank moves through a greater angle. Therefore the control point of the instrument will be adjusted small amounts for a given temperature change in the low portion range of the instrument and will be adjusted increasingly larger amounts for the same temperature change as the control point of the flow controller is moved further up scale. As a matter of fact movement of bell crank 88 and link 34 will follow the $(1-\cos \theta)$ law which is substantially the same as the square root law and follows the square root law almost exactly for the first 20° or so of its movement when the chart calibration marks are closest together.

At times it may be desirable to make on the chart, upon which the condition under control is having its record recorded, another record showing the value of the secondary condition or the value of the condition which is adjusting the control point. This may be accomplished by moving a pen in direct response to the pressure applied to chamber 46. To this end an arm 93 is attached to shaft 57 which latter is moved directly in response to pressure changes in chamber 46. Pivotally mounted on shaft 57 is a second arm 94 that is adjustably connected as shown at 95 to arm 93. The purpose of this adjustment is to give a zero adjustment to the pen on the chart. A link 96 is connected at one end to arm 94 and its other end to the end of an arm 97 (Figure 2) which is attached to a second pen shaft 98. A pen arm 99 is also attached to this shaft so that as the shaft is moved the pen arm will be moved across the chart. A pen on the lower end of this arm 99 will therefore give a record of the temperature that is used to adjust the control point of the flow.

The overall operation of the device should be apparent from the above description. A summary will however be given. In the normal operation of the device movement of link 17 acts through the differential lever mechanism to move link 11 and therefore adjust control unit 6 to control the flow. From time to time as the temperature varies pressure changes will be impressed in chamber 46 to act through the above described lever mechanism to adjust the control point of the flow controller by raising or lowering pivot 19 which is on the right end of floating lever 12. The amount that this pivot will be raised or lowered for a given temperature change will depend upon the position of span pin 63 between levers 56 and 61. The point at which such adjustment will begin to take place will depend upon the adjustment of shaft 74. In other words, the span adjustment determines the slope of the curve while the zero adjustment determines where this curve shall start. The curve referred to is one that is plotted with control point adjustment as the abscissa and the pressure in bellows 46 as the ordinate.

From time to time it may be necessary or desirable to adjust the control point of the instrument manually. This may be accomplished by moving lever 28 in a clockwise direction until pinion 26 meshes with gear teeth 25 on segment lever 21. Rotation of knob 32 will then adjust the control point of the instrument. This adjustment is carried back through the levers that have been described to the pneumatic control point adjusting unit 8. If, for example, the control point is adjusted in such a direction that link 34 will be moved to the right, the effect on the levers of unit 8 will be to raise bar 61 off pin 63. If the control point is adjusted in such a direction that link 34 is moved to the left the effect on the levers of unit 8 will be to move arm 85 away from bar 61 against the force of spring 87. The break occurs at this point in the lever system since the bellows 48 should not be expanded against the action of pressure in chamber 46. At the time that the control point of the instrument is adjusted manually to some position other than the adjustment called for by the unit 8, pin 36 will be moved against the force of spring 38 to one side or the other of slot 37. Therefore the two indices 41 and 24 will not be directly behind each other so that an operator of the instrument has an indication that the two control points do not coincide. Before returning the instrument to automatic control point adjustment the operator should adjust knob 32 or dials 69 and 84 until pointers 41 and 24 will be directly in line. This will insure that there will be no jump in the control presure when shifting back from manual to automatic control.

From the above description it will be seen that I have provided a control instrument in which the control point may be adjusted either manually or automatically and that the adjustment of the control point will follow the calibration law of the condition under control. Obviously if one temperature is being used to reset the control point of another temperature that is being controlled, link 34 may be connected directly between member 35 and the lower end of lever 78 so that a linear adjustment of the control will be obtained. This same thing will hold true if the control point of one flow is being adjusted in response to a second flow since the pressures applied in chamber 46 will then be in accordance with flow and will have the same characteristic as the flow under control. Therefore a one to one movement will be required between the lever arm 78 and the control point adjusting part 35. Obviously it is desirable to have the control point of the condition under control adjusted in accordance with the calibration characteristics of the type of condition and whether this is obtained by having 78 and 35 connected direct or connected through a system including bell crank lever 88 will be determined by the characteristic of the two conditions.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention what I claim as new and desire to secure by Letters Patent is:

1. In a control instrument having a control unit and control point adjusting means to adjust said unit to vary the value at which a condition under control is to be maintained, the combination of means to adjust said control point adjusting means manually, means to adjust said control point adjusting means automatically and means to indicate when the manual control point adjustment is not at the same value as the automatic control point adjustment.

2. In a control instrument having a control unit operative to regulate the value of a condition under control, mechanism comprising structure connected to said unit and adjustable to change the value at which said unit will maintain said condition, means to adjust said mechanism automatically, means to adjust said mechanism manually, and indicating means operated jointly by said adjusting means to indicate when said mechanism is adjusted to the same value by both of said adjusting means.

3. In a control instrument having a unit to regulate the value of a condition under control, mechanism comprising structure connected to said unit and operative to determine the value at which the condition will be maintained by said unit, means to adjust said mechanism automatically in response to variations in the value of a second condition, manually operated means to adjust said mechanism, means to render said manually operated means operative or inoperative, and means to indicate when the adjustment of said mechanism by said means to adjust is different from the adjustment of said mechanism by said manually operated means.

4. In a control instrument having a unit to control the value of a variable condition, mechanism comprising structure connected to said unit and adjustable to adjust the value at which said unit will maintain said condition, said mechanism including a first rotatable part having an index extending therefrom, a second rotatable part mounted concentric with said first part and having a second index extending therefrom, said first part being normally free to turn with said second part, resilient means to maintain normally said parts in a relative position so that said indexes over lie each other, means to move said second part and through said resilient means said first part, said resilient means having strength enough to maintain said parts in their normal relative positions, and separate means adjustable to a position in which it may rotate directly said first part, the load of said means to move said second part being sufficient to cause said resilient means to flex and permit relative movement of said parts whereby said indexes no longer overlie each other when they are adjusted by said second means.

5. A control instrument including a unit to regulate the value of a variable condition, mechanism comprising structure connected to said unit and operative to adjust the value at which said unit will maintain said condition including a first part, a first index movable with said first part, a second part, a second index movable with said second part, said first part being normally free to turn with said second part, means to maintain normally said parts in a relative position so that said indexes have a given normal position relative to each other, a second means to move said second part and, through said first mentioned means to maintain the normal relative positions of said indexes, and a third means to move directly said first part and, through the first mentioned means to permit the load imposed by said second means on said second part to cause said indexes to move from their normal relative positions as said first part is moved by said third means.

6. A control instrument having a control unit therein to regulate the value of a variable condition, means responsive to the value of a condition that varies in accordance with one law to adjust said unit, mechanism comprising structure connected to said unit and adjustable to adjust said unit to vary the value at which said condition is to be maintained, means to adjust said mechanism operated in response to variations in the value of a condition that varies in accordance with a second law that differs from said first law, and means located between said means to adjust and said mechanism to convert movement of said means to adjust in accordance with said second law into movements of said mechanism that follow said first law.

7. A control instrument having a unit operative to control a variable condition, means to adjust said unit in accordance with changes in a condition the response of which is non-linear, mechanism comprising structure connected to said unit and operative to vary the value at which said condition is to be maintained, a device to adjust said mechanism in response to variations in a condition that changes linearly, and means to convert the linear movements by said device into non-linear movements corresponding to variations in said first condition, said last means being located between said device and said mechanism.

8. A control instrument having a unit to regulate the value of a variable condition, mechanism comprising structure connected to said unit and adjustable to adjust the value at which said unit will tend to maintain said condition, remotely operated means to adjust said mechanism and means extending between said remotely operated means and said mechanism including a pivoted bell crank, a first link extending between said remotely operated means and one arm of said bell crank to rotate said bell crank and a second link extending between the other arm of said bell crank and said mechanism, the arrangement between said bell crank and links being such that for equal movements of said first link said second link will be moved through increasingly large distances from a given initial position of said parts.

9. A control instrument having a control unit therein, means to adjust said unit in response to variations in a first condition that changes in a non-linear manner, mechanism comprising structure connected to said unit and adjustable to adjust the value at which said condition is to be maintained by said unit, a device having a part movable linearly in response to changes in a second variable condition, and means to adjust said mechanism by movements of said part including a lever system operative to convert linear movements of said part to non-linear movements corresponding to the non-linear manner in which said first condition varies.

10. A control instrument having a control unit therein operative to control the value of a variable condition, mechanism comprising structure connected to said unit and operative to adjust the value at which said condition should be maintained, means to adjust said mechanism including a pair of pivoted levers, means to move one of said levers around its pivot in response to variations in a second condition, connecting means between said levers, connecting means between the second of said levers and said mechanism, and means to shift the pivot of said second lever to thereby change the adjustment of said mechanism for a given position of said first lever.

11. A control instrument having a control unit to regulate the value of a variable condition, mechanism comprising structure connected to said unit and adjustable to adjust the value at which said condition is to be maintained, means to adjust said mechanism including a pair of pivoted levers, means to move one of said levers in response to variations in a second condition, means to move the second of said levers by said one lever, means to shift the pivot point of said second lever to thereby change its relation with said one lever, and means to operate said mechanism by movements of said second lever.

12. In a control instrument having a control unit to regulate the value of a variable condition, mechanism comprising structure connected to said unit and adjustable to adjust the value at which said condition is to be maintained, means to adjust said mechanism including a first lever pivoted at one end, a second pivoted lever pivoted at the opposite end of said first lever, an adjustable thrust pin acting on opposed edges of said levers to transfer movement of said first lever to said second lever, and condition responsive means to move said first lever from a zero position to a full scale position, the opposed edges of said levers being parallel at the zero position.

EDWIN C. BURDICK.

REFERENCES CITED

The following references are of record in the file of this patent:

UNITED STATES PATENTS

| Number | Name | Date |
|---|---|---|
| 2,305,070 | Butler et al. | Dec. 15, 1942 |
| 2,338,379 | Henke | Jan. 4, 1944 |
| 2,381,948 | Gess | Aug. 14, 1945 |
| 2,397,068 | Wilson | Mar. 19, 1946 |
| 2,410,335 | Burdick | Oct. 29, 1946 |